(12) United States Patent
Smelser et al.

(10) Patent No.: US 8,402,789 B2
(45) Date of Patent: Mar. 26, 2013

(54) HIGH TEMPERATURE STABLE FIBER GRATING SENSOR AND METHOD FOR PRODUCING SAME

(75) Inventors: Christopher W. Smelser, Ottawa (CA); Stephen J. Mihailov, Kanata (CA); Dan Grobnic, Ottawa (CA); Ping Lu, Ottawa (CA); Robert B. Walker, Spencerville (CA); Gino Cuglietta, Kanata (CA); Huimin Ding, Nepean (CA); Xiaoli Dai, Ottawa (CA)

(73) Assignee: Her Majesty the Queen in Right of Canada, as Represented by the Minister of Industry, Through the Communications Research Centre Canada, Ottawa (CA)

( * ) Notice: Subject to any disclaimer, the term of this patent is extended or adjusted under 35 U.S.C. 154(b) by 0 days.

(21) Appl. No.: 13/592,845

(22) Filed: Aug. 23, 2012

(65) Prior Publication Data

US 2012/0324959 A1 Dec. 27, 2012

Related U.S. Application Data

(62) Division of application No. 12/486,796, filed on Jun. 18, 2009, now Pat. No. 8,272,236.

(60) Provisional application No. 61/073,560, filed on Jun. 18, 2008.

(51) Int. Cl.
 *C03C 25/00* (2006.01)
(52) U.S. Cl. ............... 65/392; 65/424; 65/441; 438/32
(58) Field of Classification Search ............... 65/392, 65/424, 441; 438/32
See application file for complete search history.

(56) References Cited

U.S. PATENT DOCUMENTS

| 4,807,950 A | 2/1989 | Glenn et al. | 385/123 |
| 5,111,326 A | 5/1992 | Ball | 359/244 |
| 5,237,576 A | 8/1993 | DiGiovanni et al. | 372/6 |
| 5,287,427 A | 2/1994 | Atkins et al. | 385/124 |
| 5,367,588 A | 11/1994 | Hill et al. | 430/5 |
| 5,381,229 A | 1/1995 | Murphy et al. | 356/477 |

(Continued)

FOREIGN PATENT DOCUMENTS

| CA | 2461368 | 3/2004 |
| EP | 0 435 201 B | 7/1991 |

(Continued)

OTHER PUBLICATIONS

Lemaire et al, "High Pressure $H_2$ Loading as a Technique for Achieving Ultrahigh UV Photosensitivity and Thermal Sensitivity in $GeO_2$ Doped Optical Fibres", *Electron. Lett.* vol. 29, No. 13, pp. 1191-1193, 1993.

(Continued)

*Primary Examiner* — Queenie Dehghan
(74) *Attorney, Agent, or Firm* — Teitelbaum & MacLean; Neil Teitelbaum; Doug MacLean

(57) ABSTRACT

A method of producing a thermally stable grating allows the grating to be placed in environments where temperatures reach 1000° C. These gratings may be concatenated so as to form a sensor array. The method requires a step of lowering the characteristic intensity threshold of a waveguide by at least 25%, followed by irradiating the waveguide with femtosecond pulses of light having a sufficient intensity and for a sufficient duration to write the grating so that at least 60% of the grating remains after exposures of at least 10 hours at a temperature of at least 1000° C. Pre-writing a Type I grating before writing a minimal damage Type II grating lowers the characteristic threshold of the waveguide so that a stable low damage type II grating can be written; alternatively providing a hydrogen or deuterium loaded waveguide before writing the grating lowers the characteristic threshold of the waveguide.

15 Claims, 7 Drawing Sheets

(a)

(b)

U.S. PATENT DOCUMENTS

| | | | |
|---|---|---|---|
| 5,400,422 A | 3/1995 | Askins et al. | 385/37 |
| 5,455,835 A | 10/1995 | Atkins et al. | 372/6 |
| 5,495,548 A | 2/1996 | Bilodeau et al. | 385/123 |
| 5,511,083 A | 4/1996 | D'Amato et al. | 372/6 |
| 5,620,496 A | 4/1997 | Erdogan et al. | 65/425 |
| 5,627,933 A | 5/1997 | Ito et al. | 385/123 |
| 5,790,726 A | 8/1998 | Ito et al. | 385/37 |
| 5,978,538 A | 11/1999 | Miura et al. | 385/123 |
| 6,005,999 A | 12/1999 | Singh et al. | 385/37 |
| 6,009,222 A | 12/1999 | Dong et al. | 385/127 |
| 6,104,852 A | 8/2000 | Kashyap | 385/123 |
| 6,204,926 B1 | 3/2001 | Maznev et al. | 356/521 |
| 6,221,555 B1 | 4/2001 | Murakami et al. | 430/270.1 |
| 6,236,782 B1 | 5/2001 | Kewitsch et al. | 385/43 |
| 6,282,016 B1 | 8/2001 | MacCormack et al. | 359/341.41 |
| 6,289,699 B1 | 9/2001 | Kewitsch et al. | 65/406 |
| 6,297,894 B1 | 10/2001 | Miller et al. | 359/35 |
| 6,334,018 B1 | 12/2001 | Fokine | 385/124 |
| 6,347,171 B1 | 2/2002 | Tatah et al. | 385/37 |
| 6,351,588 B1 | 2/2002 | Bhatia et al. | 385/123 |
| 6,385,369 B1 | 5/2002 | Hill et al. | 385/37 |
| 6,465,153 B1 | 10/2002 | Kewitsch et al. | 430/290 |
| 6,516,118 B1 | 2/2003 | Brilland et al. | 385/37 |
| 6,573,026 B1 | 6/2003 | Aitken et al. | 430/290 |
| 6,578,388 B1 | 6/2003 | Kewitsch et al. | 65/406 |
| 6,600,149 B2 | 7/2003 | Schulz et al. | 250/227.14 |
| 6,628,877 B2 | 9/2003 | Dugan et al. | 385/129 |
| 6,633,419 B2 | 10/2003 | Hosono et al. | 359/35 |
| 6,768,850 B2 | 7/2004 | Dugan et al. | 385/124 |
| 6,941,052 B2 | 9/2005 | Viswanathan et al. | 385/123 |
| 6,993,221 B2 | 1/2006 | Mihailov et al. | 385/37 |
| 7,031,571 B2 | 4/2006 | Mihailov et al. | 385/37 |
| 7,095,931 B2 | 8/2006 | Sezerman et al. | 385/123 |
| 7,295,731 B2 | 11/2007 | Sezerman et al. | 385/48 |
| 7,379,643 B2 | 5/2008 | Mihailov et al. | 385/120 |
| 7,515,792 B2 | 4/2009 | Mihailov et al. | 385/37 |
| 2004/0120643 A1 | 6/2004 | Viswanathan et al. | 385/37 |
| 2004/0184734 A1 | 9/2004 | Mihailov et al. | 385/37 |
| 2009/0074347 A1* | 3/2009 | Xia et al. | 385/12 |

FOREIGN PATENT DOCUMENTS

| | | |
|---|---|---|
| EP | 0 668 514 B | 8/1995 |
| EP | 1 291 985 A | 3/2003 |
| EP | 1400819 | 3/2004 |
| EP | 1 460 459 | 9/2004 |
| EP | 1 462 831 | 9/2004 |
| WO | WO 97/15851 A | 5/1997 |
| WO | WO 01/35136 A1 | 5/2001 |

OTHER PUBLICATIONS

Davis et al. "Writing Waveguides in Glass with a Femtosecond Laser" Opt. Letts, vol. 21, Nov. 21, 1996 pp. 1729-1731, 1996.

Svalgaard et al, "Directly UV written silica-on-silicon planar waveguides with low loss", Electron. Lett., vol. 33, No. 10, pp. 861-863, 1997.

Svalgaard, "Direct writing of planar waveguide power splitters and directional couplers using a focused ultraviolet laser beam", Electron. Lett., vol. 33, No. 20, pp. 1694-1695, 1997.

Dalle et al, "Growth kinetics and thermal annealing of UV-induced H-bearing species in hydrogen loaded germanosilicate fibre performs", Journal of Non-Crystalline Solids, vol. 260, No. 1-2, pp. 83-98, 1999.

Sudrie et al, "Study of damage in fused silica induced by ultra-short IR laser pulses", Opt. Comm., vol. 191, No. 3-6, pp. 333-339, 2001.

Takada et al, "Slab-waveguide irradiation of uv laser light for photosensitive phase error compensation of arrayed-waveguide gratings", IEEE Photon. Tech. Lett., vol. 14, No. 6, pp. 813-815, 2002.

Love et al, "Tapered Single-Mode Fibres and Devices", IEEE Proceedings, Journal vol. 138, No. 5, pp. 343-354, Oct. 1991.

Nam et al, "Fabricating in Fiber Gratings in Single Crystal Sapphire Fiber", Components and Materials, Proceedings of SPIE Optical, vol. 5350, pp. 58-59 and 61-63, Jan. 26, 2004.

Grobnic et al, "Sapphire Fiber Bragg Grating Sensor Made Using Femotosecond Laser Radiation for Ultrahigh Temperature Applications", IEEE Photonics Tech. Ltrs, vol. 16, No. 11, pp. 2505-2507, Nov. 2004.

Mihailov et al, "Bragg Gratings Written in All-SiO2 and Ge-Doped Core Fibers with 800-nm Femtosecond Radiation and a Phase Mask", Journal of Lightwave Technology, vol. 22, No. 1, Jan. 1, 2004.

Tong, "Growth of High-quality Y2 O3-ZrO2 Single Crystal Optical Fibers for Ultra-high-temperature Fiber-optic Sensors", Journal of Crystal Growth vol. 217, No. 3, pp. 281-286, Aug. 1, 2000.

Measures et al, "Wavelength Demodulated Bragg Grating Fiber Optic Sensing Systems for Addressing Smart Structure Critical Issues", Smart Materials and Structures, No. 1. No. 1, Mar. 1, 1992.

Mihailov et al, "Fabrication of fiber bragg gratings (FBG) in all-$Sio_2$ and Ge-doped core fibers with 800 nm picosecond radiation", Optical Society of America, Proceedings of the Bragg Gratings, Photosensitivity and Poling in Glass Waveguides Conference BGPP2003, pp. 194-196, 2003.

Dyer et al, "Analysis of grating formation with excimer laser irradiated phase masks", Optics Comm. 115, vol. 115, pp. 327-334, 1995.

Mills et al, "Imaging of free-space interference patterns used to manufacture fiber bragg gratings", Applied Optics, vol. 39, pp. 6128-6135, Nov. 2000.

Mizrahi et al, "Stable Single-Mode Erbium Fiber-Grating Laser for Digital Communication", J. Lightwave Technol. 11 (12), pp. 2021-2025, 1993.

Kreger et al, "High Pressure Sending Using Fiber Bragg Gratings Written in Birefringent Side Hole Fiber", Proceedings of the Optical Fiber Sensors Conference (OFS 15) 2002, pp. 355-358.

Erdogan et al, "Characterization of UV-Induced Birefringence in Photosensitive Ge-doped Silica Optical Fibers", J. Opt. Soc. Am. B, 11 (10), pp. 2100-2105, 1994.

Vengsarkar et al, "Birefringence Reduction in Side-Written Photoinduced Fiber Devices by a Dual-Exposure Method", Opt. Lett. 19 (16) pp. 1260-1262, 1994.

Bricchi et al, "Form Birefringence and Negative Index Change Created by Femtosecond Direct Writing in Transparent Materials", Opt. Lett. 29 (1), pp. 119-121, 2004.

Glezer et al, "Ultrafast-Laser Driven Micro-Explosions in Transparent Materials", Appl. Phys. Lett. 71 (24), pp. 882-884, 1997.

Dürr et al, "Tomographic Measurement of Femtosecond-Laser Induced Stress Changes in Optical Fibers", Appl. Phys. Lett 84 (24), pp. 4983-4985, 2004.

M. Dubov et al, "Highly Biregringent Long Period Gratings Fabricated With Femtosecond Laser", OWI50 of the Proceedings of the Optical Fiber Communications Conference, (2006).

Lai et al, "Distributed Bragg Reflector Fiber Laser Fabricated by Femtosecond Laser Inscription", Opt. Lett. 31 (11), pp. 1672-1674, 2006.

Bhardwaj et al, "Stress in Femtosecond-Laser-Written Waveguides in Fused Silica", Opt. Lett. 29 (12), pp. 1312-1314, 2004.

Grobnic et al, "Long-Term Thermal Stability Tests at 1000° C of Silica Fibre Bragg Gratings Made With Ultrafast Laser Radiation", Meas. Sci. Technol. 17 (5), p. 1009-1013, 2006.

Smelser et al., "Formation of Type I-IR and Type II-IR gratings with an ultrafast IR laser and a phase mask", Opt. Express, vol. 13, pp. 5377-5386, 2005.

Smelser et al., "Hydrogen loading for fiber grating writing with a femtosecond laser and a phase mask", Opt. Letters, vol. 29, pp. 2127-2129, 2004.

Grobnic et al., "Ultrafast IR Laser Writing of Strong Bragg Gratings Through the Coating of High Ge-Doped Optical Fibers", Photon. Technol. Letters, vol. 20, No. 12, pp. 973-975, 2008.

Smelser et al., "Characterization of Fourier components in type I infrared ultrafast laser induced fiber Bragg gratings", Opt. Letters., vol. 32, 1453-1455, 2007.

Smelser et al., "Impact of index change saturation on the growth behavior of higher-order type I ultrafast induced fiber Bragg gratings", J. Opt. Soc. Am. B., vol. 25, pp. 877-883, 2008.

Smelser et al., "Fabrication of femtosecond laser induced Bragg gratings in amorphous and crystalline dielectric waveguide", SPIE, vol. 3796, pp. 67961E-1-69761E-14, 2007.

Zhan et al., "Fabricating harsh environment fiber Bragg gratings by ultra fast laser", SPIE, vol. 6314, pp. 6314101-63141011, 2006.

Aslund et al., "Annealing properties of gratings written into UV-presensitized hydrogen-outdiffused optical fiber", Optical Letters, vol. 20, No. 10, pp. 692-694, 2006.

* cited by examiner

Fig 3 Evolution of the grating refractive index modulation after one hour at temperature between room and 1000 °C

HIGH TEMPERATURE STABLE FIBER GRATING SENSOR AND METHOD FOR PRODUCING SAME

CROSS-REFERENCE TO RELATED APPLICATIONS

The present application is a divisional application of U.S. patent application Ser. No. 12/486,796, filed Jun. 18, 2009, U.S. Pat. No. 8,272,236, entitled HIGH TEMPERATURE STABLE FIBER GRATING SENSOR AND METHOD FOR PRODUCING SAME, which claims priority from U.S. Provisional Patent Application Ser. No. 61/073,560, filed Jun. 18, 2008 and U.S. Pat. No. 7,689,087, issued Mar. 30, 2010, which claims priority from U.S. Provisional Patent Application Ser. No. 60/893,156, filed Mar. 6, 2007, all of which are incorporated herein by reference.

FIELD OF THE INVENTION

The present invention relates to a sensing apparatus and method for measurement of pressure, strain, temperature, or displacement or index of refraction of a high temperature environment and more particularly to a fiber Bragg grating sensor inscribed therein capable of measuring temperature, strains, and environment at temperatures up to 1000° C.

BACKGROUND OF THE INVENTION

Fiber Bragg grating sensors (FBG sensors) have demonstrated themselves to be attractive devices for sensing temperature and strain along an optical fiber. Variations in the spectral response of the grating result from period changes in the Bragg grating due to strains or temperature variations that are experienced by the in-situ optical fiber. These FBG sensors offer important advantages over other sensor technologies because of their electrically passive operation, electromagnetic interference (EMI) immunity, high sensitivity and multiplexing capabilities. Fiber Bragg gratings are simple, intrinsic sensing elements which traditionally have been UV photo-inscribed into photosensitive Ge-doped silica fiber. Each FBG sensor has a characteristic retro-reflective Bragg resonance or Bragg wavelength, which is dependent upon the periodicity of the grating photo-inscribed within the fiber and the effective refractive index difference in the grating regions of the optical fiber. The FBG sensors can then easily be multiplexed in a serial fashion along a length of single fiber. When embedded into composite materials, By continuing the exposure and grating inscription of the fiber in the type I regime such that the index modulation becomes about $>3\times10^{-3}$, the threshold for type II grating formation is reduced in a continuous fashion until it traverses the grating inscription intensity, which in this instance was $\sim 1.5\times10^{13}$ W/cm$^2$. The index modulation value is likely directly inversely proportional to the type II threshold intensity value.

Optical fibers with an array of FBG sensors allow for distributed measurements of load, strain, temperature and vibration of the material creating what has is commonly referred to as "smart structures" where the health and integrity of the structure is monitored on a real-time basis.

Typically fiber Bragg gratings are generated by exposing the UV-photosensitive core of a germanium doped silica core optical fiber to a spatially modulated UV laser beam in order to create permanent refractive index changes in the fiber core. Such a spatially modulated UV beam can be created by using a two-beam interference technique as disclosed in U.S. Pat. No. 4,807,950 by Glenn et al. or by using a phase mask as disclosed in U.S. Pat. No. 5,367,588 by Hill et al. The techniques taught by Glenn and Hill result in gratings that are typically referred to as Type I gratings.

A limitation of the prior-art UV-induced Type I fiber Bragg gratings, especially for high temperature sensor applications is that operation of the sensor at elevated temperatures results in the erasure or annealing of the UV-induced color centers and densification which are responsible for the induced index change of the grating. In fact, at temperatures approaching the glass transition temperature of the fiber, which for silica is approximately 1000° C., total erasure of the induced index modulation results. The fiber also is modified at such high temperatures making it brittle with diffusion of the core material into the cladding. The fiber can easily be deformed by its own weight.

Another method for creating permanent photoretractive index changes in glasses employs the use of intense UV beams with fluences or energy/unit-area per laser pulse densities that approach those required to produce macroscopic damage of the glass. Askins et al. in U.S. Pat. No. 5,400,422 teach a method for producing permanent photoretractive index changes in the photosensitive cores of Ge-doped optical fibers with single high intensity UV laser pulses. Such Bragg gratings resulting from macroscopic damage to the glass optical fiber are typically referred to as Type II gratings. The high intensity portions of the interference fringes created by two crossed UV beams split from a single UV beam create localized damage at the core-cladding interface within the fiber. Because the process for inducing index change is one of structural change due to localized physical damage to the glass, rather than due to UV photoinduced color center formation, the induced index change is more robust and does not decrease with elevated temperature. In fact Askins et al. disclose that gratings produced in this way cannot be removed by annealing until the fiber or waveguide approaches the material's glass transition temperature. The drawback of this approach for induction of index change is that the Bragg gratings produced in this fashion have relatively low refractive index modulations ($\Delta n=10^{-4}$) and are mechanically weak since the effective refractive index change results from periodic localized damage at the core-cladding interface. When the pulse duration is long (>a few tens of picoseconds) laser-excited electrons can transfer energy to the surrounding lattice faster than the thermal diffusion of the material can remove the energy resulting in damage. If the laser pulse continues to feed energy into the damage site, the damage can propagate beyond the irradiated zone. For damage grating structures written with long laser pulse durations greater than a few tens of picoseconds, the spectral quality of the resulting Bragg grating is often poor.

Another method for creating permanent photoretractive index changes in optical fiber employs the use of the process of "hydrogen-loading," as taught by Atkins et al. in U.S. Pat. No. 5,287,427, combined with UV-laser exposure of optical fiber that is manufactured with a core that is co-doped with fluorine. Subsequent to the UV exposure the fiber then undergoes a thermal post treatment at 1000° C. in order to induce a chemical composition grating as taught by Fokine in U.S. Pat. No. 6,334,018. As with the technique taught by Askins et al., the technique taught by Fokine also has the drawback that the induced index change of the Bragg gratings produced in this fashion have relatively low refractive index modulations ($\Delta n=10^{-4}$).

The fabrication of high temperature stable Bragg gratings using infrared ultrafast radiation and a phase mask, as taught by Mihailov et al in U.S. Pat. No. 6,993,221 results in high temperature stable Bragg gratings with very high index modulations ($\Delta n > 10^{-3}$). As shown by Smelser et al. *Opt. Express.*, vol. 13, pp. 5377-5386, 2005, laser beam intensities greater than $4 \times 10^{13}$ W/cm$^2$ at the surface of the optical fiber result in the formation of thermally stable Bragg gratings similar to Type II UV-induced gratings, but with much higher index modulations. In the case of gratings fabricated using the techniques taught in U.S. Pat. No. 6,993,221, the index modulation results from a threshold type process of multiphoton absorption/ionization that results in plasma formation and the possible creation of microvoids. Although strong gratings can be formed using the approach taught in U.S. Pat. No. 6,993,221, the resulting gratings suffer from high scattering loss making it difficult to concatenate a large number of Bragg grating sensors into a sensor array on a single length of optical fiber. The threshold nature of the process also makes it more difficult to tailor the induced index profile of the grating in terms of its apodization, reflectivity and reflection bandwidth. Using the technique taught by Mihailov et al in U.S. Pat. No. 7,031,571, Smelser et al. showed that very high index modulations ($\Delta n > 10^{-3}$) could be created with laser beam intensities lower than $4 \times 10^{13}$ W/cm$^2$ that did not possess high scattering loss however these gratings were not high temperature stable and the index modulation likely arising from color center formation and material densification, erased at temperatures >800° C.

The inventors have recently discovered that induction of extremely large index modulations ($\Delta n > 3 \times 10^{-3}$) in Germanium doped telecommunication optical fiber using the technique disclosed by Smelser et al. in *Opt. Letters.*, vol. 29, pp. 2127-2129, 2004 has the beneficial effect of being stable up to 1000° C.

The thermal stability of the refractive index change that is generated using prolonged laser exposures consistent with a type I grating formation process may be caused by the extremely large index modulations that are generated. In one aspect of the present invention the inventors arrive at these high levels of index modulation for example $3 \times 10^{-3}$, through the process of hydrogen loading of Ge-doped silica fibers coupled with femtosecond infrared laser exposure through a phase mask.

In accordance with another aspect of the invention, an extremely high index modulation such as $3 \times 10^{-3}$ can be generated by femtosecond infrared laser exposure consistent with type I grating formation in optical fibers or waveguides which have high concentrations of core co-doping with for example Germanium. In Grobnic et al *Photon. Technol. Lett.* vol. 20, no. 12, pp. 973-975, 2008, high NA, high Ge-doped core fibers are more photosensitive to femtosecond IR radiation than standard telecom (low Ge-core concentration) fibers. It is possible that large index changes induced in the high Ge-doped fibers have improved thermal stability. We believe that such high refractive index changes for example $3 \times 10^{-3}$ lower the intensity threshold sufficiently to yield a stable grating with minimal scatter.

It is an object of this invention to overcome the aforementioned limitations within the prior art systems for fabrication of high temperature FBG sensors by inducing large refractive index modulations in silica-based optical fibers that are relatively stable up to 1000° C. and which do not suffer from high scattering or insertion loss and.

SUMMARY OF THE INVENTION

An optical waveguide sensor is provided which has written into the core or cladding thereof, a retro-reflective structure in the form of a grating that is suitable as a sensor in high temperature environments up to 1000° C.

In accordance with this invention a method is provided comprising:

providing an optical waveguide having a characteristic threshold intensity;

lowering the characteristic intensity threshold of the waveguide by a suitable amount so as to prevent unwanted type II damage normally associated with writing a type II grating which results in scattering;

providing electromagnetic radiation from an ultrashort pulse duration laser, wherein the electromagnetic radiation has a pulse duration of less than or equal to 500 picoseconds, wherein the wavelength of the electromagnetic radiation has a characteristic wavelength corresponding to infrared light, the electromagnetic radiation incident on the optical waveguide being sufficiently intense to cause a permanent change in an index of refraction within the core of the optical waveguide.

It should be noted that the step of lowering the characteristic intensity threshold of the waveguide, preferably by at least 25%, can be realized by hydrogen or deuterium loading the optical waveguide before writing the grating or alternatively by pre-writing the waveguide with a Type-1 grating before writing the desired grating.

In accordance with this invention a method is provided comprising:

providing a photosensitive optical waveguide that is photosensitized by exposing the optical waveguide to one of hydrogen and deuterium gas;

providing electromagnetic radiation from an ultrashort pulse duration laser, wherein the electromagnetic radiation has a pulse duration of less than or equal to 500 picoseconds, wherein the wavelength of the electromagnetic radiation has a characteristic wavelength corresponding to infrared light, the electromagnetic radiation incident on the photosensitive optical waveguide being sufficiently intense to cause a permanent change in an index of refraction within the core of the photosensitive optical waveguide.

In accordance with an aspect of this invention a method of writing a grating in a doped glass is provided wherein the non-linear absorption to IR irradiation is increased by hydrogen or deuterium loading of the doped glass prior to irradiating with infrared light having an intensity of at least $10^9$ W/cm$^2$ and less than $10^{13}$ W/cm$^2$, and wherein the hydrogen or deuterium loading of the doped glass lowers the intensity threshold of the glass. Preferably the glass is Ge doped.

Aside from enhanced photosensitivity of Ge-doped silica caused by hydrogen loading, other dopant materials used for waveguides in silica that are photosensitive to UV exposure also benefit from improved photosensitivity by hydrogen loading. These include co-doping of Ge with Boron (B) or Tin (Sn). Other dopants that exhibit enhanced photosensitivity, exclusive of Ge, when hydrogen loaded are phosphorous ($P_2O_5$), silicon oxynitride (SiON or nitrogen doped), aluminosilicate ($Al_2O_3$) and aluminosilicate codoped with terbium ($Tb^{3+}:Al_2O_3$), or cerium ($Ce^{+3}:Al_2O_3$), or erbium ($Er^{+3}:Al_2O_3$) or ytterbium ($Yb^{+3}:Al_2O_3$) or Europium ($Eu^{2+}$) or Tantalum ($TaO_5$) or Thulium. It is believed that the photosensitivity to high intensity ultrafast IR radiation of these dopants, or combination thereof, would be enhanced through hydrogen or deuterium loading.

In accordance with an another aspect of this invention the photosensitivity of said optical waveguide is arrived at through high concentrations of core dopants such as Germanium, but in the absence of hydrogen or deuterium loading.

BRIEF DESCRIPTION OF DRAWINGS

Exemplary embodiments of the invention will now be shown in conjunction with the drawings in which:

FIG. 1 (b) shows the diffracted phase mask orders combining to produce an interference pattern that is then inscribed into the photosensitive material.

DETAILED DESCRIPTION OF THE INVENTION

Figure 1:
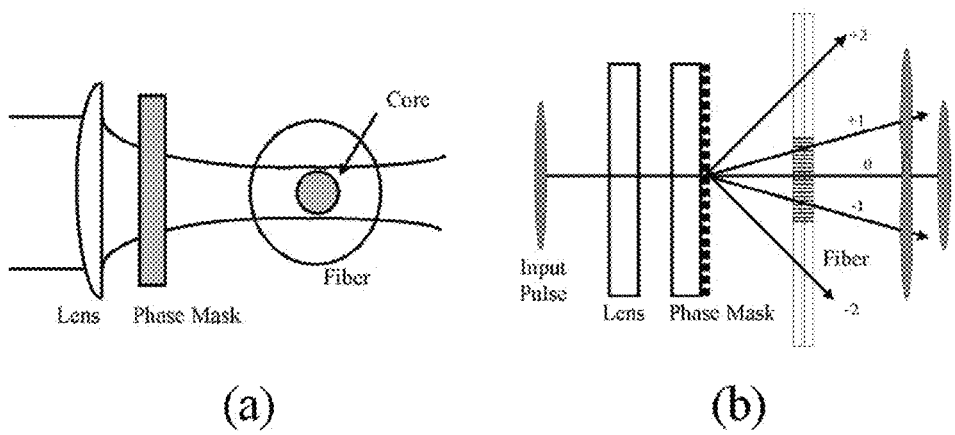
FIG. 1 (a) shows the output of an amplified ultrafast laser being focused through a silica phase mask onto the core of an optical fiber.

Germanium doped silica based optical devices, specifically those formed in optical fiber, are an attractive medium for high temperature sensing applications (<1100° C.). Fiber Bragg gratings are an attractive sensing device as the wavelength of the Bragg resonance is temperature and strain dependent.

The fabrication of phase mask assisted ultrafast infrared induced fiber Bragg gratings is described in U.S. Pat. No. 7,031,571 by Mihailov et al., incorporated herein by reference. Ge-doped Corning SMF-28 fiber was loaded with molecular hydrogen at a pressure of 2600 psi and a temperature of 23° C. for 14 days and kept at −40° C. until it was exposed. Fiber Bragg gratings were then inscribed by focusing the output of an amplified Ti:Sapphire femtosecond 800 nm laser through a silica phase mask onto a fiber sample, as shown in FIG. 1a where the laser beam 100 is focused through lens 102 onto a phase mask 104. The output light from the phase mask 104 is then focused on the core 108 of the optical fiber 110.

In the writing of a Bragg grating the repetition rate of the laser was set at 100 Hz with a temporal pulse length of 125 fs. The focal length of the lens was 30 mm and the pitch of the phase mask was 4.28 μm. The fiber was positioned 3 mm beyond the phase mask in order to ensure that, due to phase mask order walk-off, only a pure two-beam interference pattern was inscribed in the fiber, as shown in FIG. 1 (b). The incident laser pulse energy for all the gratings was set at 450 μJ, resulting in a peak interference field intensity of ~1.5× $10^{13}$ W/cm$^2$, which is below the threshold intensity required to produce a grating in unloaded SMF-28 fiber as shown in Smelser et al. *Opt. Exress.*, vol. 13, pp. 5377-5386, 2005. The incident laser beam had a 1/e intensity spot radius of ~3.2 mm. For a 30 mm focal length lens the resulting free space focal spot would be ~5 μm×6.4 mm. As the 5 μm focus is less than the ~8 μm diameter of the fiber core, the beam is scanned vertically with a piezo-actuated stage ±15 μm with a total sweep period of 20 s. The evolution of the transmission loss of the gratings at 1550 nm was recorded continuously with a broadband erbium source and a spectrum analyzer.

For non-H$_2$-loaded low Ge-doped standard telecom fiber, the characteristic intensity threshold for Type II grating formation was shown by Smelser et al. *Opt. Express.*, vol. 13, pp. 5377-5386, 2005 to be 4×10$^{13}$ W/cm$^2$. This characteristic intensity threshold is dependent upon the characteristics of the waveguide and every waveguide has an inherent characteristic intensity threshold. It has been demonstrated in Smelser et al. *Opt. Letters.*, vol. 29, pp. 2127-2129, 2004 that fiber Bragg gratings formed using ultrafast lasers below the aforementioned Type II grating threshold intensity in both hydrogen loaded and unloaded Ge-doped telecommunications fiber are not stable at temperatures exceeding 800° C. when the initial induced peak index modulation is less than 1×10$^{-3}$. This type of fiber grating formation has been referred to as the Type I ultrafast IR induced regime. The low temperature stability of this type of index change is clearly demonstrated in Smelser et al. *Opt. Letters.*, vol. 29, pp. 2127-2129, 2004 and by Smelser et al. *Opt. Express.*, vol. 13, pp. 5377-5386, 2005.

Phase masks with pitches that are integer multiples of the smallest pitch required to produce a resonance at 1550 nm in Ge-doped silica (1.07 mm) can easily be used to fabricate gratings with ultrafast laser sources. The modulation profile of the induced index change that results from ultrafast grating fabrication is not a pure sinusoid, where UV induced index change is initially sinusoidal, and will produce higher order resonances without the need for saturation of the induced index change. For larger phase mask pitches the magnitude of the resonance at 1550 nm is smaller than the it would be for a 1.07 mm pitch mask due to a smaller Fourier component corresponding to that Bragg resonance (Smelser et al. *Opt. Letters.*, vol. 32, 1453-1455, 2007). For high order phase masks, such as those with pitches of 3.21, 4.28, 5.35 mm's and higher, a very large index change will be induced in the medium before a significant resonance is observed at ~1550 nm.

The peak induced index change for a fiber grating is most reliably determined by the magnitude of the shift of the wavelength of the Bragg resonance as the grating is formed. The wavelength shift during the formation of the grating is an indicator of the contribution of the induced index change to the effective index of the core mode of the fiber. The evolution of the Fourier components of ultrafast induced gratings, as shown in Smelser et al. *J. Opt. Soc. Am. B.*, vol. 25, pp. 877-883 (2008), suggests that a total wavelength shift of ~2.5 nm corresponds to a total peak induced index change of ~5×10$^{-3}$.

Figure 2:
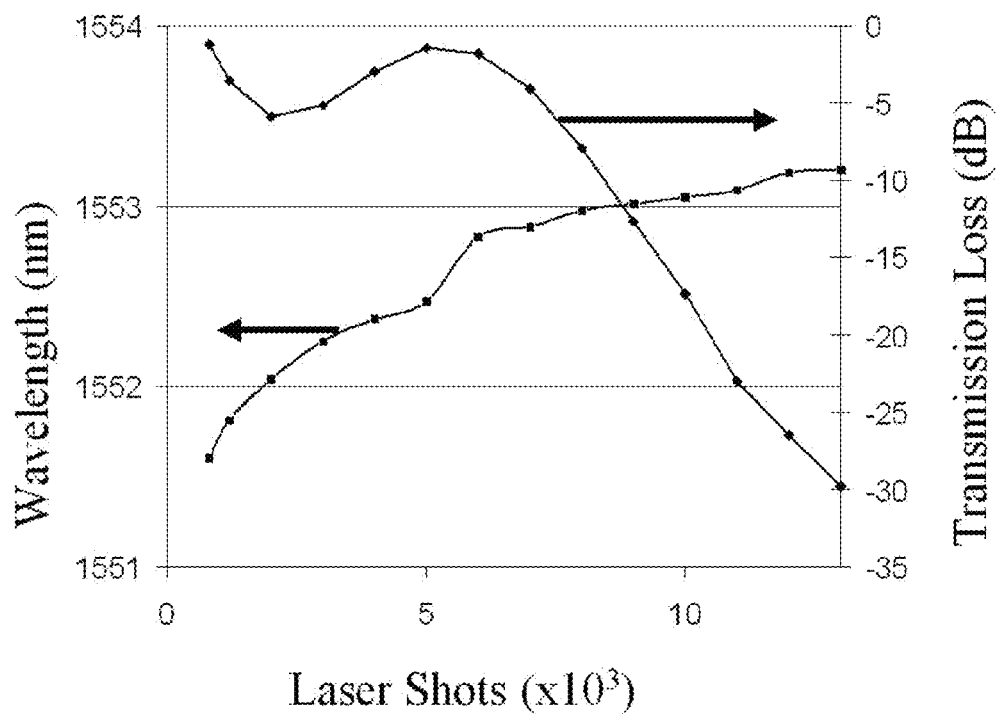
FIG. 2 shows the evolution of the transmission loss at the Bragg wavelength (1550 nm) and the wavelength shift for a grating fabricated in hydrogen loaded SMF-28 fiber with a 4.28 mm pitch phase mask. The total wavelength shift is ~1.8 nm, corresponding to a peak induced index change of ~4× $10^{-3}$.
Figure 3:
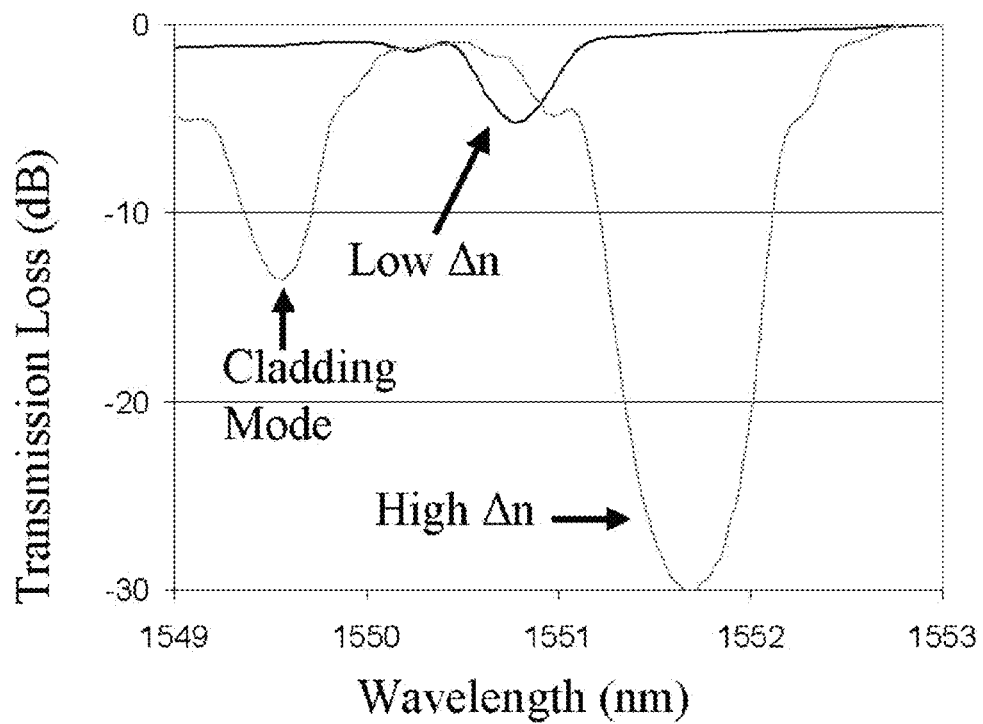
FIG. 3 shows the grating spectra that result from the fabrication of a low $\Delta n$ ($<1\times10^{-3}$) and high $\Delta n$ ($>3\times10^{-3}$) ultrafast infrared induced fiber Bragg grating in hydrogen loaded SMF-28 fiber with a 4.28 mm pitch phase mask.

The spectral evolution of a grating written with a 4.28 mm pitch phase mask and the corresponding wavelength shift in Hydrogen loaded SMF-28 fiber is shown in FIG. 2. The loss at ~1550 nm increases until it reaches a turning point, after which it appears to be arrested and begins to disappear. As the irradiation continues the loss reappears and eventually grows until it approaches 30 dB or higher. The peak loss shifts to a longer wavelength for the entire duration of the grating growth. The grating spectra for gratings fabricated with a transmission loss of 5 dB and 30 dB are shown in FIG. 3. The wavelength shift for the 30 dB grating is ~1.8 nm. This would correspond to a peak index change of ~$4\times10^{-3}$.

Figure 4:
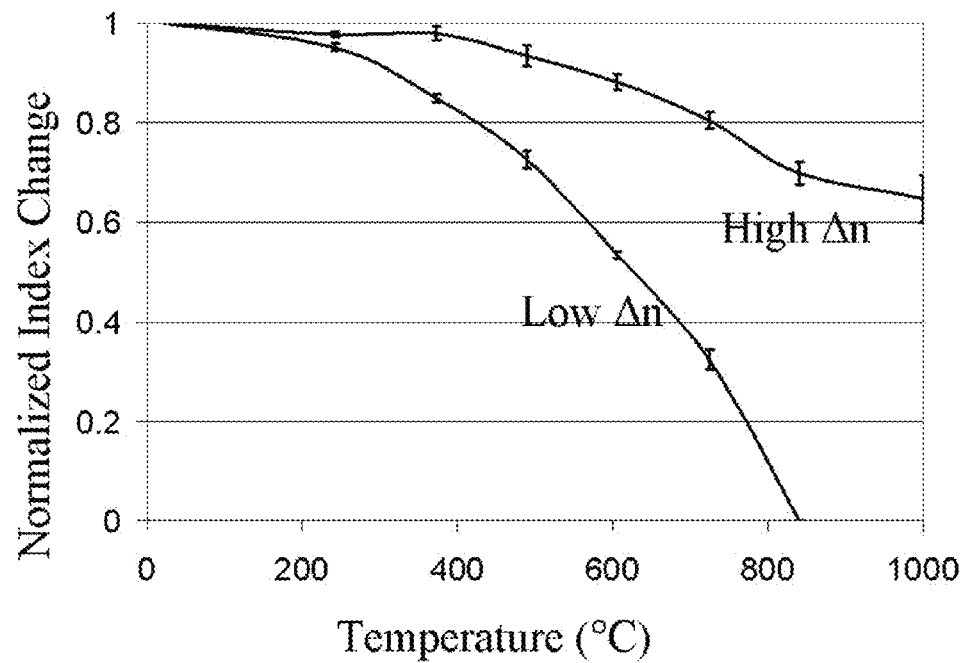
FIG. 4 shows the isochronal annealing curves of 2 sets of 3 gratings. Each grating was annealed in steps of ~150° C. per hour starting at ~25° C. or room temperature. The set of 3 high $\Delta n$ gratings retain in excess of 60% of their initial peak index change at 1000° C. while the low $\Delta n$ are completely annealed out below 900° C.

The average isochronal annealing curves of a set of 3 small ($<1\times10^{-3}$) and a set of 3 large ($>3\times10^{-3}$) peak index change gratings are compared in FIG. 4. The error bars represent the standard deviation from the mean. The gratings have been annealed in steps of ~150° C. from room temperature up to 1000° C. with the grating resting at each temperature for one hour. The gratings that have been formed with large index change retain a large amount (in excess of 60%) of their initial induced index change for temperatures at temperatures of 1000° C. Further exposure of the high index change grating to temperatures of 1000° C. for 100 hours resulted in no further reduction of index modulation. The small index change gratings are clearly completely annealed out at a temperature of ~850° C. By continuing the exposure and grating inscription of the fiber in the type I regime such that the index modulation becomes greater or equal to about $3\times10^{-3}$, the threshold for type II grating formation is reduced in a continuous fashion until it traverses the grating inscription intensity, which in this instance was ~$1.5\times10^{13}$ W/cm$^2$. We believe that the index modulation value is directly inversely proportional to the type II threshold intensity value.

Figure 5:
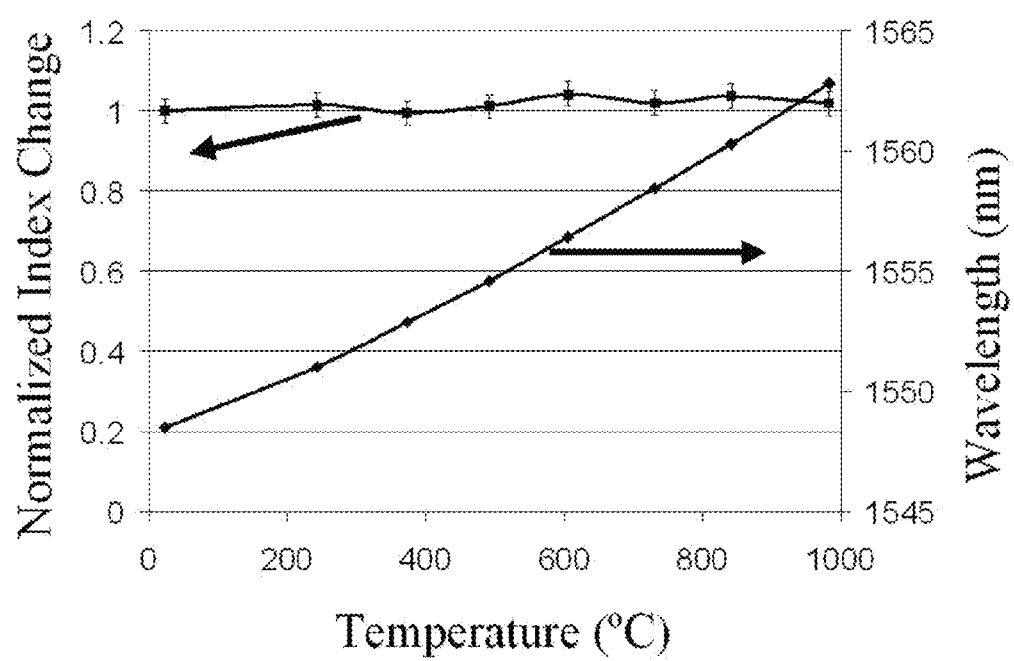
FIG. 5 shows the isochronal annealing curve and wavelength shift for a grating that has been preannealed at a temperature of 1000° C. Clearly there is no additional degradation in the induced index change and the wavelength shift is nearly linear with a slope of ~15 pm/° C. There was no hysteresis in the initial wavelength after the grating was cooled back down to room temperature.

The temperature dependent wavelength shift and normalized refractive index change for a large Δn grating formed with a 4.28 μm phase mask in hydrogen loaded SMF-28 fiber after it has been pre-annealed at a temperature of 1000° C. for 100 hours is shown in FIG. 5. There is no further diminishment of the peak index change and the wavelength shift is nearly linear with a slope of ~15 pm/° C. No hysteresis in the initial wavelength at room temperature is observed after cycling.

The use of a higher order grating is advantageous as large peak index changes, corresponding with high temperature stability, can be induced in the medium before a large resonance is observed at 1550 nm. This is, however, not a necessary requirement, as large index changes induced with lower order masks should also exhibit heightened temperature stability.

In accordance with this invention, the high temperature stable grating sensor made with prolonged exposures of hydrogen loaded fiber is different from our previous disclosures in that previous high temperature stable gratings for sensors required exposures with intensities that resulted in standard type II structures (multiphoton ionization, void formation, etc.

With the technique disclosed here of using 'low intensities' as defined in our hydrogen loading U.S. Pat. No. 7,515,792, a thermally stable type I structure is created. However previously, lower values of index change that produced the gratings in the type I regime were not thermally stable and erased at higher temperatures. However, in accordance with this invention, by prolonging the low intensity exposure such that a very large index change is induced in the fibre (>0.005), the majority of the index change is stable at 1000° C.

A disadvantage of a standard type II process absent hydrogen or deuterium loading for producing high temperature stable grating sensors is that because the induced index change is generated through an all or nothing type of threshold process, it is more difficult to tailor the induced index profile of the grating (apodization, amount of reflectivity etc). With a couple of dozen pulses from the laser, very high index modulations are created that are thermally stable but sometimes difficult to finely control grating reflectivity and bandwidth. Disadvantageously the type II structures result in scattering or insertion loss (~20% per device), which makes concatenation of several of these devices in a sensor array not practicable. With a type I process, where a similar thermal stability is achieved but with 15,000 pulses, better control of the filter spectrum is possible. It is our understanding that the insertion loss of the thermally stable type I grating is similar to that of a standard type I grating so potentially hundreds of thermally stable type I gratings could be concatenated into a sensor array.

Advantageously, hydrogen or deuterium loading of the waveguide allows one to write what we believe to be a type II grating in a type I regime where more control is achieved by lowering the characteristic intensity threshold of the waveguide or fiber. Furthermore, prolonged writing provides a large refractive index difference of about $3\times10^{-3}$ which unexpectedly provides a grating that remains stable at 1000° C. so that at least 60% of the grating remains.

We have also discovered, in an alternative embodiment of this invention, that it possible to reduce the threshold intensity required to write a grating that will have desired characteristics of lower scattering than a standard type II grating would have, and permanence so that at least 60% of the grating is not erased when exposed to temperatures up to 1000° C. for long periods of time. As with the previously described examples, this embodiment although not requiring exposure to hydrogen or deuterium also requires a step of lowering the characteristic intensity threshold of the waveguide by at least 25% before irradiating the waveguide with femtosecond pulses of light.

While there are presently a number of techniques to fabricate high temperature FBGs, such as type IIA, FBGs in nitrogen doped silica fiber, and low reflectivity chemical composition gratings, we have noticed that only the Type II and chemical composition FBGs display stability at 1000° C. However, standard type II Bragg gratings are basically damage gratings resulting from the interaction of high-energy radiation with the silica host. Initially type II FBGs were made with high intensity single UV pulses resulting in gratings with low spectral quality.

Figure 6:
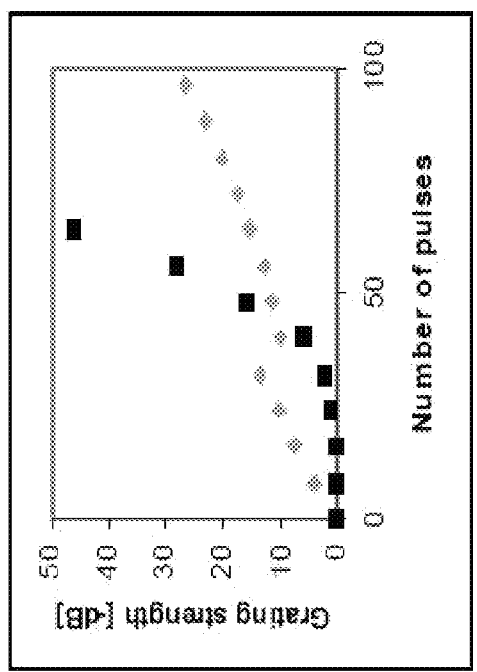
FIG. 6 is a plot of number of pulses versus grating strength indicating the evolution of the grating strength comparing a high energy type II grating versus writing a type I followed by what we believe is a type II grating but having less damage than a standard type II grating.

Recently high quality multiple-pulse type II gratings were inscribed in the core and cladding of different optical fibers with femtosecond infrared (IR) pulsed radiation using the phase mask method. In the case of type II gratings made with ultrafast radiation and a phase mask, the gratings are not pre-treated or pre-conditioned during fabrication to lower the threshold intensity and are fabricated by placing the fiber close to the phase mask so that the multiple beam interference will generate the high intensity pattern required. The resulting refractive index growth, as denoted by the increase of the strength of the Bragg resonance with the number of laser pulses, is complex and very rapid. This is shown in FIG. 6. After an initial exposure period with little or no growth in grating reflectivity, the spectral response grows very rapidly as compared to the growth of a type I grating. This growth pattern makes the control of the grating strength relatively difficult.

In accordance with this invention a new writing process for type II FBG structures is provided, wherein initially a defect/compaction related type I grating structure is written in the fiber core, followed by a writing process characteristic of type II gratings. Advantageously the resulting grating has the thermal characteristics of a type II grating but is written at lower energy densities than the normal type II femtosecond gratings and is of better spectral quality. In an alternative embodiment this method is also useful for writing gratings into any region of an optical waveguide such as the cladding and is not only limited to writing within the core region.

Experiment and Results

FBGs were written using a regeneratively amplified 800-nm ultrafast Ti:sapphire (*Spectra Physics—Spitfire*) laser operating in a femtosecond regime. The laser beam was focused through a 30 mm focal length cylindrical lens and a zero-order-nulled silica phase mask with 2.14 μm pitch into the core of SMF28 fiber. According to the Gaussian beam approximation the focal spot width was computed to be ~10 μm with a length of 6.4 mm. The beam was scanned across the waveguide by dithering the focusing lens with 20 μm amplitude at 0.05-Hz frequency. The FBGs were monitored during the inscription time using an ANDO spectrum analyzer and a broadband source. The Type I grating is written first by positioning the fiber 2 mm behind the phase mask to ensure that the interference pattern generated by the phase mask was due to only the ±1 diffracted orders and the exposure was made with 1 mJ energy pulses at a repetition rate of 100 Hz. After the type I grating is written, the beam is blocked and the fiber moved closer to the phase mask at a position of approximately 500 μm behind the phase mask so that the multiple beam interference pattern will supply the high radiation intensity required for writing type II grating structures. The fiber and the lens are then re-aligned. The energy of the ultrafast pulses is set to 750 μJ and the laser repetition rate to 5 Hz. During the type II grating inscription, only a small erasure of the type I grating is observed. The type II structures continue to grow as can be seen in FIG. 6. The period of the type II grating is the same as the mask while the period of the type I grating is half the period of the mask Prewriting the fiber with a Type I grating in the manner described preconditions the fiber so that the threshold intensity of the waveguide is lowered preferably by at least 25%. The steps of prewriting the fiber with a Type I grating are disclosed in U.S. Pat. No. 7,031,571 incorporated herein by reference.

Figure 7:
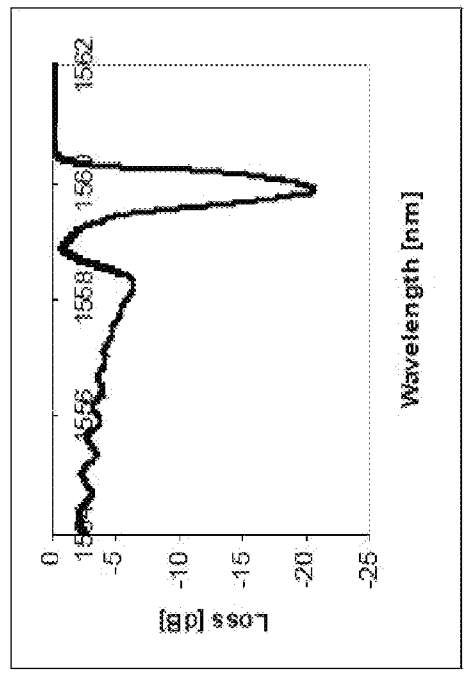
FIG. 7 is a graph indicating the spectral characteristics of a type II grating.

The spectral characteristics of this type II grating are shown in FIG. 7 and are similar to those of type II gratings inscribed directly into the fiber with high energy, for example the high cladding mode. The broadband loss for high-energy type II gratings can range from 1 to 5 dB. In the case of the low energy type II grating, the broadband loss is below 0.5 dB for a large index modulation and the strength of the grating is easier to control since the grating growth is less rapid.

For high-energy type II gratings without the pre-existence of a type I structure, absorption of the radiation in the fiber is initially very low and increases along with the growth of the type II grating. It is likely then that the formation of the type II grating is helping to couple radiation into the fiber. This can also explain the initial requirement for high intensity radiation. When the type I grating pre-exists in the fiber, coupling of subsequent radiation facilitates type II grating growth at lower intensities and at a slower pace. The experiment was repeated using a high Germania doped fiber. In this instance it was possible to write type II gratings with less than 500 μJ/pulses.

Figure 8:
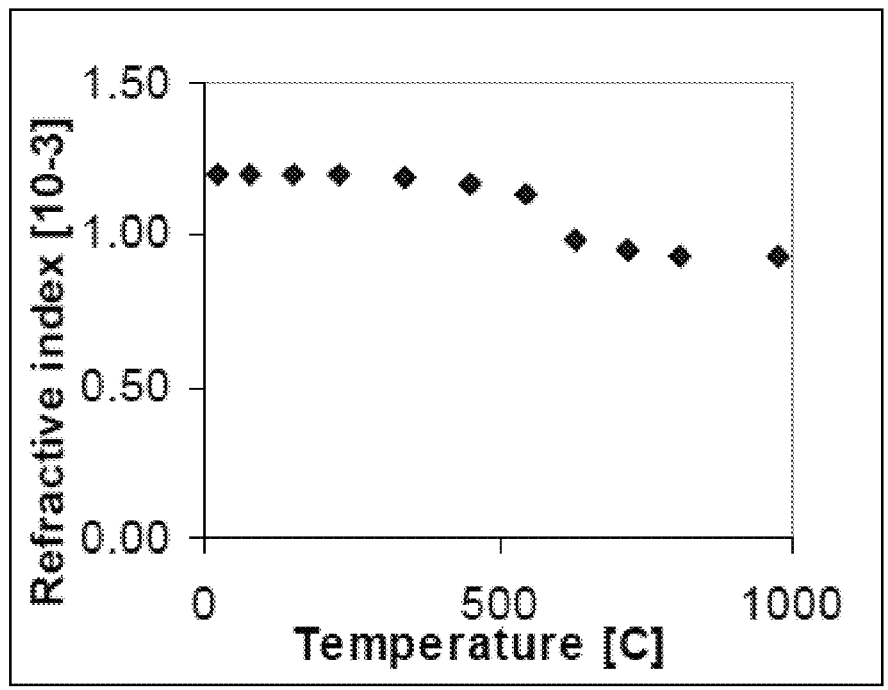
FIG. 8 is a graphs of temperature versus refractive index and shows the evolution of the grating refractive index after one hour at room temperature and 1000° C.

In order to evaluate the stability of the refractive index generated in the writing process described above, the grating was annealed in a micro-oven at temperatures up to 1000° C. for 1 hour at each temperature. The results are presented in FIG. 8. Up to approximately 400° C., there is no degradation of the grating. Between 400-700° C., the grating looses a small amount of strength probably due to erasure of the initial type I grating and then shows high thermal stability up to 1000° C. The grating was further annealed at 1000° C. for 10 hours and showed no significant degradation and at least 60% of the grating remained.

In summary, there are at least two ways in which the characteristic intensity of an optical fiber can be lowered: by hydrogen or deuterium loading prior at writing a grating with femtosecond pulses or by prewriting a grating in the optical fiber as is described above. By performing this lowering of the intensity threshold a substantially permanent grating with little scatter results.

What is claimed is:

1. A method of producing a thermally stable grating comprising the sequential steps of:
    a) providing an optical waveguide having a type II characteristic intensity threshold for type II grating formation;
    b) lowering the type II characteristic intensity threshold for type II grating formation of the waveguide by at least 25%; and,
    c) irradiating the waveguide with femtosecond pulses of light having a sufficient intensity and for a sufficient duration to write the grating having a peak refractive index change Δn so that at least 60% of the peak refractive index change Δn of the grating remains after exposures of at least 10 hours at a temperature of at least 1000° C., wherein the sufficient intensity is less than the type II characteristic intensity threshold for type II grating formation of the optical waveguide;
    d) wherein the step of lowering the characteristic intensity threshold comprises the step of prewriting a grating in the optical fiber.

2. A method as defined in claim 1, wherein the sufficient intensity is at least $10^{11}$ W/cm$^2$.

3. A method as defined in claim 2, wherein the sufficient intensity is at least $7 \times 10^{12}$ W/cm$^2$.

4. The method as defined in claim 2, wherein the thermally stable grating is written in the core of the optical waveguide and wherein the thermally stable grating is a Bragg grating.

5. The method of claim 4, wherein a plurality of thermally stable gratings are formed within the waveguide.

6. The method of claim 4, wherein a plurality of thermally stable gratings are formed within plural waveguides using the method of claim 4 and wherein said waveguides are concatenated to form a sensor array.

7. A method as defined in claim 6, wherein the loss associated with the thermally stable Bragg grating is less than 1.0 dB.

8. A method as defined in claim 4, wherein the loss associated with the thermally stable Bragg grating is less than 1.0 dB.

9. A method of claim 1 wherein the thermally stable grating has a refractive index difference between adjacent high and low refractive index regions within the glass of at least $3 \times 10^{-3}$.

10. A method of claim 1, wherein the waveguide is an optical fiber having at least a region therein about the thermally stable grating that is doped.

11. A method of claim 10, wherein the thermally stable grating is doped with Germania.

12. The method of claim 1, wherein the step of prewriting a grating includes the step of prewriting a first Type-I grating in the waveguide before performing step (c).

13. The method of claim 12, wherein the step of prewriting the first Type-1 grating includes the steps of:

disposing a phase mask adjacent to the waveguide; and, irradiating surface of a phase mask with electromagnetic radiation having a predetermined wavelength range and having a pulse duration of less than or equal to 100 picoseconds, wherein the mask is disposed to permit a portion of the electromagnetic radiation to interact with the mask and be incident on the waveguide, the interaction of the electromagnetic radiation with the mask for producing a plurality of diffracted orders greater than two, wherein at least one of the diffracted orders is a pair, the interaction of the electromagnetic radiation with the mask for producing a spatial intensity modulation pattern within the waveguide, the electromagnetic radiation incident on the waveguide being sufficiently intense to cause a change in an index of refraction of the waveguide, wherein the step of disposing a mask to be used as an interferometer includes the steps of disposing and orienting the mask adjacent to the waveguide at least a distance "d" such that group velocity walk-off results in pure two-beam interference within the waveguide wherein the distance "d" is chosen such that the difference in times of arrival of the order pairs due to group velocity walk-off results in the pure two-beam interference pattern of sub-beams of said pulse of light that have passed through the mask.

14. The method of claim 13, wherein the period of the Type-1 grating is approximately half the period of the phase mask used to inscribe the grating which is approximately half the period of the grating written in step (c).

15. A method of producing a thermally stable Bragg grating in an optical waveguide comprising:
  a) providing an optical waveguide having a type II characteristic intensity threshold for type II grating formation;
  b) lowering the type II characteristic intensity threshold for type II grating formation of the waveguide by at least 25% by prewriting a grating in the optical fiber; and,
  c) irradiating the waveguide with femtosecond pulses of light having an intensity of at least $10^9$ W/cm$^2$ and less than $5\times10^{13}$ W/cm$^2$ for a sufficient duration so that at least 60% of the grating remains after exposures of at least 10 hours at a temperature of at least 1000° C.

* * * * *